United States Patent [19]

Tschoepe

[11] Patent Number: 4,621,364
[45] Date of Patent: Nov. 4, 1986

[54] CIRCUIT ARRANGEMENT FOR RECORDING THE ADDRESSES OF STORAGE CELLS WITH ERRONEOUS CONTENT

[75] Inventor: Norbert Tschoepe, Munich, Fed. Rep. of Germany

[73] Assignee: Siemens Aktiengesellschaft, Berlin and Munich, Fed. Rep. of Germany

[21] Appl. No.: 644,094

[22] Filed: Aug. 24, 1984

[30] Foreign Application Priority Data

Sep. 9, 1983 [DE] Fed. Rep. of Germany ....... 3332601

[51] Int. Cl.⁴ .............................. G06F 11/10
[52] U.S. Cl. ....................... 371/38; 371/21; 371/13
[58] Field of Search .................... 371/38, 13, 5, 21

[56] References Cited

U.S. PATENT DOCUMENTS

| | | | |
|---|---|---|---|
| 4,532,628 | 7/1985 | Matthews | 371/38 |
| 4,535,455 | 8/1985 | Peterson | 371/38 |
| 4,542,454 | 9/1985 | Breich | 371/38 |
| 4,549,295 | 10/1985 | Purvis | 371/38 |

Primary Examiner—Michael R. Fleming
Attorney, Agent, or Firm—Thomas H. Jackson

[57] ABSTRACT

To record the address of a storage cell that has contents that are erroneous with respect to the coding, a memory configuration, connected by means of a bus line system with a central control unit, is equipped with a register in the recording cells of which can be written the address of the selected storage cell which is transmitted over the bus line system during the performance of a read cycle in the memory's configuration. Each memory contents that are read out from one of the storage cells in the course of such a read cycle are checked in an error-recognition circuit for the existence of a coding error. When a coding error of this kind is recognized, the error recognition circuit then emits an appropriate error signal. In response to such an error signal, a control device locks out the register for the reception of another address transmitted over the bus line system. In addition, this control device causes the central control unit to evaluate the address last written into the recording cells of the register as the address of a faulty storage cell.

3 Claims, 4 Drawing Figures

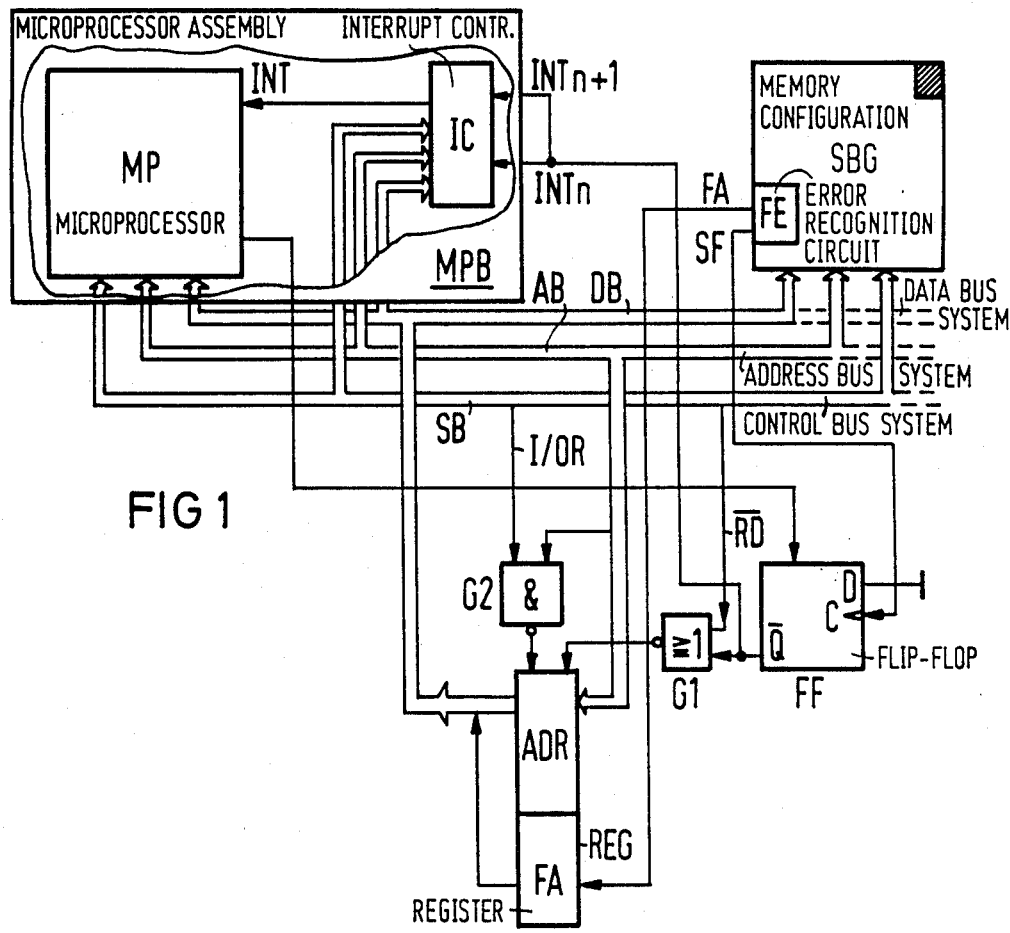

CIRCUIT ARRANGEMENT FOR RECORDING THE ADDRESSES OF STORAGE CELLS WITH ERRONEOUS CONTENT

BACKGROUND OF THE INVENTION

The invention relates to a circuit arrangement for recording the addresses of storage cells having erroneous contents with respect to coding and which are part of a memory configuration connected through a bus line system to a central control unit.

It is customary when processing data signals transmitted to a central control unit from peripheral equipment or from memory configurations, to check the data signals for error-free coding before they are processed. There are a great number of familiar coding processes for this purpose, which permit the recognition of specific errors in the data signals, caused by faults along the transmission path. When errors of this kind occur, it is desirable, for the systematic location of a faulty peripheral or memory configuration that is connected with the central control unit, to record addresses with regard to the peripheral or memory configuration emitting the erroneous data signals, for subsequent checking.

SUMMARY OF THE INVENTION

The object of the invention is therefore to provide apparatus, a circuit arrangement of the kind described above by means of which, addresses of storage cells, each of which has erroneous contents with respect to coding, can be recorded with a small amount of additional circuitry.

This object is accomplished according to the invention by having a register with a large number of recording cells connected with the bus line system, in which recording cells there can, on the one hand, be written in the respective address that is conveyed over the bus line system when the memory configuration is driven in order to read out the contents of the storage cell designated by this address, and which recording cells can, on the other hand, be read out by an appropriate command from the central control unit, by providing an error-recognition circuit, which examines each of the contents read out from one of the storage cells for any coding error that may be present, and which emits an appropriate error signal when such a coding error is recognized, and by providing a control device, which, in response to an error signal emitted by the error-recognition circuit, locks the register for the transfer of another address transmitted over the bus line system and in addition causes the central control unit to evaluate the address last written into the recording cells as the address of a faulty storage cell.

The invention offers the advantage that the recording of addresses of storage cells, each of which has an erroneous content, can occur without any dynamic burdening of the respective central control unit. Only after the storage of an address of this kind, does the central control unit receive a signal on the basis of which it can initiate the specific measure that may be necessary to continue the operation or to eliminate the error.

To further reduce the load on the central control unit, it is advantageous if signals coded in a correctible code can be written into the storage cells of the memory configuration, if the error-recognition circuit, upon recognition of a coding error makes, if necessary, a correction of the erroneous coding and emits, together with the error signal, an information signal which states whether the coding recognized as erroneous could or could not be corrected, and if the register has another recording cell which is used for the storage of such an information signal.

It is desirable for the control device to have a flip-flop, which, when an error signal is present, switches to a state such that a logic element connected with an output of this flip-flop, which permits the register to be driven, is in its lock-out state. This offers the advantage of requiring only minimal circuitry for driving the register.

BRIEF DESCRIPTION OF DRAWINGS

FIG. 1 shows diagrammatically a section of a microprocessor system in which the invention is used.

FIG. 2A shows the states of the flip-flop FF shown in FIG. 1.

FIG. 2B shows the performance of an interrupt routine n in the microprocessor assembly shown in FIG. 1.

FIG. 2C shows the performance of a second interrupt routine n+1 in the microprocessor assembly shown in FIG. 1.

DETAILED DESCRIPTION

FIG. 1 shows a section of a microprocessor system having microprocessor assembly MPB, of which only a microprocessor MP and an interrupt control IC belonging to it, with several interrupt inputs INTn, INTn+1 are shown. On its output side, for the emission of an interupt signal which causes an interuption of one of the processes controlled by microprocessor MP, this interrupt control is connected with interrupt control input INT of microprocessor MP. Data inputs and outputs of interrupt control IC are connected to data bus system DB, which is used to transmit data signals from or to the microprocessor. Through this data bus system, on the one hand, information signals are transmitted, together with an interrupt signal, to the microprocessor. These signals contain data with regard to the level of the interrupt priority of the interrupt signal occurring precisely at one of the interrupt inputs and forwarded to the microprocessor. On the other hand, as will be explained later on, individual interrupt inputs of the interrupt control can be activated or deactivated from the microprocessor through this data bus system by means of appropriate signals.

Microprocessor MP and interrupt control IC are also connected with address bus system AB, which is used for the transmission of address signals, and with control bus system SB, through which control signals are transmitted. The control signals in question are used to control the communication between microprocessor MP and the elements of the microprocessor system that are connected to it. Control signals of this kind include write and read signals for the control of memory configurations or peripheral equipment. The only representation of these memory configurations and peripheral equipment units belonging to the microprocessor system in FIG. 1 is a memory configuration designated by SBG.

Memory configuration SBG, which is connected to the bus system described above, possesses, in the embodiment discussed here, an error recognition circuit, designated in FIG. 1 as FE. This error circuit, upon reading out a storage cell, checks its content for the existence of a coding error and, if necessary, corrects the error. For this purpose, the data signals to be transmitted within the microprocessor system are coded according to the code known as the Hamming code. This code makes it possible to correct 1-bit errors and to recognize 2-bit errors. Upon the recognition of one of these errors, error recognition circuit FE emits an appropriate error signal at an error output SF. In addition, at an output designated, FA, it emits an information signal, which states whether the coding that has been recognized as erroneous can be corrected or not.

The error output SF of memory configuration SBG, which has just been mentioned, is connected with the clock input of flip-flop circuit FF. The flip-flop in question is a so-called D flip-flop, whose D-input is connected to ground or to a voltage corresponding to the logic 0 level, and whose output $\overline{Q}$ can be set at a specified output state from microprocessor MP. In this case the output designated by $\overline{Q}$ is connected to the interrupt inputs INTn and INTn+1 of the abovementioned interrupt control IC of microprocessor assembly MPB. Here, n or n+1 is used to show the level of interrupt priority assigned to the respective interrupt inputs. In other words, an interrupt signal applied to input n+1 has priority over a similar signal applied to input n. It should be noted at this point that when the microprocessor is in an error-free state, only the interrupt input INTn is activated. The interupt input INTn+1 is initially deactivated. As has already been explained, the activation or deactivation of the individual interrupt inputs is accomplished by signals transmitted from the microprocessor over data bus system DB. For receiving these signals, interrupt control IC is driven by address bus system AB and control bus system SB.

The output designated by $\overline{Q}$ of flip-flop FF is also connected to the input of a NOR element G1. At another input, this NOR element receives a read signal RD that is transmitted over control bus system SB, with which a storage cell of the memory configuration SBG is read out. The output of NOR element G1 is connected to a release input of a register REG, consisting of two separate register sections. The first register section, designated ADR, is used to receive the addresses transmitted over address bus system AB. For this purpose, it contains a number of recording locations that corresponds to the number of the address bits belonging to an address. At its output side, this register section, at an appropriate command from microprocessor MP, feeds the address that is stored in it to data bus system DB.

In a second register section of the register REG, which is designated FA, is received the information signal emitted by output FA of memory configuration SBG when a coding error is recognized. This information signal is emitted, together with the address stored in the register section ADR, to data bus system DB when an appropriate command is given. The command just mentioned to register REG for the output of the signals that are stored in it is given with the aid of a NAND element G2. This NAND element receives at one of its inputs a read signal I/OR conducted from the microprocessor over control bus system SB, with which transmission of signals stored in input/output devices is controlled. Another input of NAND element G2 is connected with an address line of address bus system AB, over which an appropriate adress signal for addressing register REG as an output device is transmitted.

Now that the construction of the circuit shown in FIG. 1 has been explained, we shall proceed to describe the mode of operation of this circuit arrangement with reference to FIG. 2. For this purpose, we shall assume that the microprocessor system shown in FIG. 1 is initially in an error-free state. In this state flip-flop FF is set from the microprocessor in such a way that it emits a logic 0 level at its $\overline{Q}$ output. The interrupt input INTn+1 of interrupt control IC is as has already been mentioned, deactivated in the error-free state.

Now, if read signals RD are emitted from the microprocessor to read out the signals stored in the storage cells of memory configuration SBG, the register REG is released through NOR element G1 with every read signal for the reception of the address transmitted over address bus system AB together with the respective read signal. With each address received in this manner, a previously stored address is overwritten. If during the read-out of one of the storage cells by error recognition circuit FE a coding error is recognized, and, if necessary, corrected, then the circuit emits an error signal at its output SF and an information signal at its output FA. The information signal, which is received in register section FA of register REG, indicates to microprocessor MP, as has already been described above, whether the coding fault was correctible or not. When an error signal is present, flip-flop FF switches to an error-indicating state (a in FIG. 2A). This state is characterized by a logic 1 level at output $\overline{Q}$. This logic level effects the lock-out of the NOR element G1, so that the address of the storage cell containing the erroneous content, which has just been received in register REG, cannot be overwritten by other addresses.

In this error-indicating state, a logic 1 level exists at the $\overline{Q}$ output of flip-flop FF. This logic level is interpreted by interrupt control IC as an interrupt signal and forwarded to microprocessor MP. Since the interrupt input n+1 is initially deactivated here, an information signal is transmitted to the microprocessor in addition to this interrupt signal, which assigns the interrupt priority n to the interrupt signal. On the basis of these signals, the microprocessor terminates the processes controlled by it and starts an interrupt routine (b in FIG. 2) corresponding to interrupt priority n. In the course of this interrupt routine, the microprocessor receives the address stored in register REG and the information signal stored in register section FA. Then flip-flop FF is returned to its starting position (c in FIG. 2A). In addition, the interrupt input n+1 of interrupt control IC is now activated (d in FIG. 2C).

After receiving the address stored in register REG together with the information signal stored in register section FA, the storage cell corresponding to this address is read out again from the microprocessor. In an examination of the memory content by error recognition circuit FE shows that a coding error is again present, then flip-flop FF returns again to its error-indicating state (e in FIG. 2A).

Interrupt control IC recognizes an interrupt signal through the interrupt input n+1, which is now activated, and forwards this signal to the microprocessor, giving an interrupt priority of n+1. Since this interrupt signal has a higher interrupt priority than the interrupt signal which has triggered the interrupt routine that is just taking place, the interrupt routine that is just taking place is interrupted (f in FIG. 2B), and an interrupt routine corresponding to the interupt priority n+1 is commenced (g to h in FIG. 2C), and then initially interrupted interrupt routine n is continued (i to k in FIG. 2). Before the completion of this interrupt routine, flip-flop FF is again put into its starting position, in order to recognize any further errors in memory configuration SBG (1 in FIG. 2A). As a result of the interlocking performances of the interrupt routines n and n+1 which have just been described, it is possible to distinguish between static errors persisting beyond a prescribed first time span and dynamic errors that do not exceed a prescribed second time span, when errors occur in memory configuration SBG. The measures that are required when dynamic errors occur are controlled by the performance of the interrupt routine n without interruption caused by an interrupt signal with the interrupt priority n+1. On the other hand, if an interruption of the interrupt routine n takes place, as will be the case in the event of a static error, then the measures required when static errors occur are controlled by the interrupt routine n+1 in connection with interrupt routine n.

FIG. 1 shows only the situation in which all the storage cells of memory configuration SBG are brought together in space and connected with a joint error recognition circuit FE. However, the storage cells belonging to the memory configuration can also be distributed among different circuit assemblies within the microprocessor system. In this case it is advantageous to locate error recognition circuit FE centrally in microprocessor assembly MPB.

In conclusion, it should be noted here that the storage cells of memory configuration SBG should be understood to include not only storage cells of ROM memories and write/read memories. Instead, they are to be understood to include, in general, any elements of the microprocessor system that store data signals, such as registers, input/output components, etc., and can be driven by addresses from the microprocessor for the emission of the data signals that are stored in them.

Finally, it should be pointed out that an intel type 8259 component can be used for the abovementioned interrupt control IC. Also, error-recognition circuit FE can be made from an Advanced Micro Devices type AM 2960 component.

There has thus shown and described a circuit arrangement for recording the addresses of storage cells with erroneous contents which fulfills all objects and advantages sought therefor. Many changes, modifications, variations and other uses and applications of the subject invention will, however, become apparent to those skilled in the art after considering the specification and the accompanying drawings which disclose embodiments thereof. All such changes, modifications, variations and other uses and applications which do not depart from the spirit and scope of the invention are deemed to be covered by the invention which is limited only by the claims which follow.

What is claimed is:

1. A circuit arrangement for recording addresses of storage cells, each of which have data contents that are erroneous with respect to encoding, the storage cells being of a memory configuration connected with a central control unit through a bus system, whereby the circuit arrangement for recording addresses comprises:

an error detection circuit which, during an accessing of data of the memory configuration by the central control unit, examines stored data contents read from the storage cells with respect to encoding errors and emits a respective error signal upon a detection of such an encoding error;

first recording cells which can be read by the central control unit and which accept at least part of address information occurring on the bus system while the memory configuration is being accessed by the central control unit;

second recording cells which can be read by the central control unit and which accept information signals which indicate the type of encoding error detected by the error detection circuit;

and a control configuration which, by emitting an input signal at an interrupt input of the central control unit when an error signal is present, causes the control unit to read said first and second recording cells for an evaluation whereby the first recording cells immediately accept, when the memory configuration is accessed for the purpose of reading the data contents of the storage cells, an entire address information forwarded by the central control unit;

the second recording cells accept said encoding error type information signals when an error signal is present, and said control configuration is connected with a first interrupt input of the central control unit, which is activated during the fault-free state of the circuit arrangement, and with a second interrupt input with a higher interrupt priority than the first interrupt input, which is deactivated during the fault-free state of the circuit arrangement, such that the control configuration, when an error signal is present, locks out, on one hand, the first recording cells from the reception of additional address information, and on the other hand, starts, through the first interrupt input of the central control unit, a first interrupt routine in the central control unit which serves for determining the presence of dynamic errors and, during the course of the determination, said second interrupt input of the central control unit is activated; and that upon a renewed access by the central control unit of the storage cells designated by the entire address information stored in said first recording cells, the control configuration effects, in the case of another error signal prior to the completion of the first interrupt routine in progress, by means of the second interrupt input which is now activated, an additional interrupt routine for determining static errors.

2. The circuit arrangement according to claim 1, wherein signals encoded in an error correcting code can be written into the storage cells of the memory configuration, and wherein the error detection circuit, upon detecting encoding errors, performs a correction of the erroneous encoding, if possible, and emits, together with the error signal, information signals indicating whether the encoding detected as erroneous should be corrected or not.

3. Circuit arrangement according to claim 1, wherein said control configuration further comprises a flip flop which is connected at its output with said first register cells as well as with the first and second interrupt inputs of the central control unit in a manner such that, when an error signal is present, the first recording cells are locked out from the reception of additional address information and either the first or the second interrupt routine is started in the central control unit.

* * * * *